United States Patent [19]

Rocton

[11] 4,263,473
[45] Apr. 21, 1981

[54] SEALED CONNECTION BETWEEN A COAXIAL UNDERWATER CABLE AND AN ELECTRONIC APPARATUS

[75] Inventor: Lucien Rocton, Malakoff, France

[73] Assignee: Compagnie Industrielle des Telecommunications Cit-Alcatel, Paris, France

[21] Appl. No.: 64,165

[22] Filed: Aug. 6, 1979

[30] Foreign Application Priority Data

Aug. 11, 1978 [FR] France .................. 78 23719

[51] Int. Cl.³ .................. H02G 9/02; H02G 15/14
[52] U.S. Cl. .................................. 174/70 S
[58] Field of Search .................. 174/70 S, 89

[56] References Cited
U.S. PATENT DOCUMENTS

| | | | |
|---|---|---|---|
| 3,349,163 | 10/1967 | Rocton | 174/70 S |
| 3,600,499 | 8/1971 | Hibbs | 174/70 S |
| 3,609,651 | 9/1971 | Sladek | 174/89 X |
| 3,780,210 | 12/1973 | Rocton | 174/70 S |
| 4,207,428 | 6/1980 | Cosier et al. | 174/89 X |

*Primary Examiner*—Roy N. Envall, Jr.
*Attorney, Agent, or Firm*—Roland Plottel

[57] ABSTRACT

Electronic equipment, e.g. a repeater and/or an equalizer is housed in an underwater housing (10). Each end of the housing is closed by a cover (11) and a sealed electrical connection must be provided between an underwater coaxial line cable (5) and the electronic equipment. The connection is provided by a lead-in length (1) of coaxial cable. This is initially connected to the electronics for final testing before it is sealed inside its housing. Thereafter the cover (11) and the sealing-/fastening arrangements are threaded over the lead-in cable and the housing is sealed.

7 Claims, 3 Drawing Figures

SEALED CONNECTION BETWEEN A COAXIAL UNDERWATER CABLE AND AN ELECTRONIC APPARATUS

The present invention relates to providing a sealed connection between a section of coaxial line cable, called hereinafter the line cable, and a submerged housing, i.e. a repeater and/or an equalizer, sais cable being sealed and having a generally coaxial structure.

The invention applies to undersea telecommunications links, and in particular to submerged repeaters of the "rigid" type which include a metal housing formed by a cylinder which is closed by two covers and whose outside may or may not be isolated from sea water, and inside which the pressure is low and there is an electronics block formed by separation and amplification components for the signals which come from the line cable. The invention relates to the particular means for connecting the line cable to the repeater while providing the required sealing.

Several arrangements for connecting a repeater to a coaxial line conductor cable are already known. In particular, there can be cited those disclosed by French Pat. Nos. 1,400,550 and 2,163,388 in the applicant's name (for English language equivalents, see U.S. Pat. Nos. 3,349,163 and 3,780,210) and which use several lengths of linking or connection cable, sealed electric through bushings for access to the inside of a repeater and a sealed junction box between these lengths of cable. Inside the housing, these electric through bushings are connected to the electronics block by another length of cable. On the outside of the housing, the electric through bushings, the length of cable which leads to the through bushings and the junction box with the upstream length of cable are then potted in a casing which is also moulded over the cover of the housing.

Preferred embodiments of the present invention allows a line cable to be connected to an electronics block inside a submerged housing, while avoiding the multiplicity of circuits required to constitute known connection arrangements and while allowing the characteristics of the connecting arrangement to be taken into account in the final measurements and adjustments of the electronics block while it is still possible to act on the electronics block.

The present invention provides a sealed connection between a coaxial underwater cable and an underwater device comprising an electronics block housed in a sealed housing; said housing having at least one cover including an access and a length of lead-in coaxial cable which passes through the access in a sealed manner, the lead-in cable being connected to the electronics block at one end and having means at its other end external to the housing for connection to a coaxial cable, wherein a length of the lead-in coaxial cable in the vicinity of where it passes through the access is stripped of its outer conductor and the insulation surrounding the inner conductor is fitted in the bore of a metal tube having a notched outer surface, i.e. a surface which is crenellated in axial section, the outside end of the notched metal tube being electrically connected to the outer conductor of the lead-in coaxial cable by means of a metal shell which covers a plug of insulating material itself welded to a stripped length of the insulation covering the inner conductor and also embracing a notched length of the notched metal tube to provide a grip thereon, the inside end of the notched metal tube being electrically connected to the electronics block via annular metal bellows, and the lead-in cable being provided where it passes through the access with sealing means and means for locking it therein.

The present invention also provides a method of providing a sealed connection between a coaxial underwater cable and an underwater device comprising an electronics block housed in a sealed housing, the method comprising the steps of: electrically and mechanically connecting a length of lead-in cable to the electronics block, said length including means for sealing it to a cover of the housing and for locking it therein; performing final electrical tests on said electronics block via the lead-in cable and making any adjustments that may be required while said electronics block is still accessible; and then threading the lead-in cable through an access in the cover to the housing and sealing the cover to the housing and to the lead-in cable. Thus, the electronics block is equipped with its complete connecting arrangement which is itself equipped with sealing means. The final measurements and adjustments of the electronics block can be made while the electronics block is still accessible from the end of the device which is ready to be connected to the line conductor cable. With respect to known devices, besides the various connections made while at sea, the device also avoids the use of through bushings in the housing and of excessive length of cable, in particular between the electronics block and the outlet of the housing.

Two embodiments of the invention are described by way of example with reference to the accompanying drawings, in which:

FIG. 1 illustrates a repeater equipped with a connection arrangement in accordance with the invention, for connecting it to a coaxial line cable; the connection arrangement is illustrated on a larger scale in FIG. 2, which shows a cross-section thereof.

Figure 1:
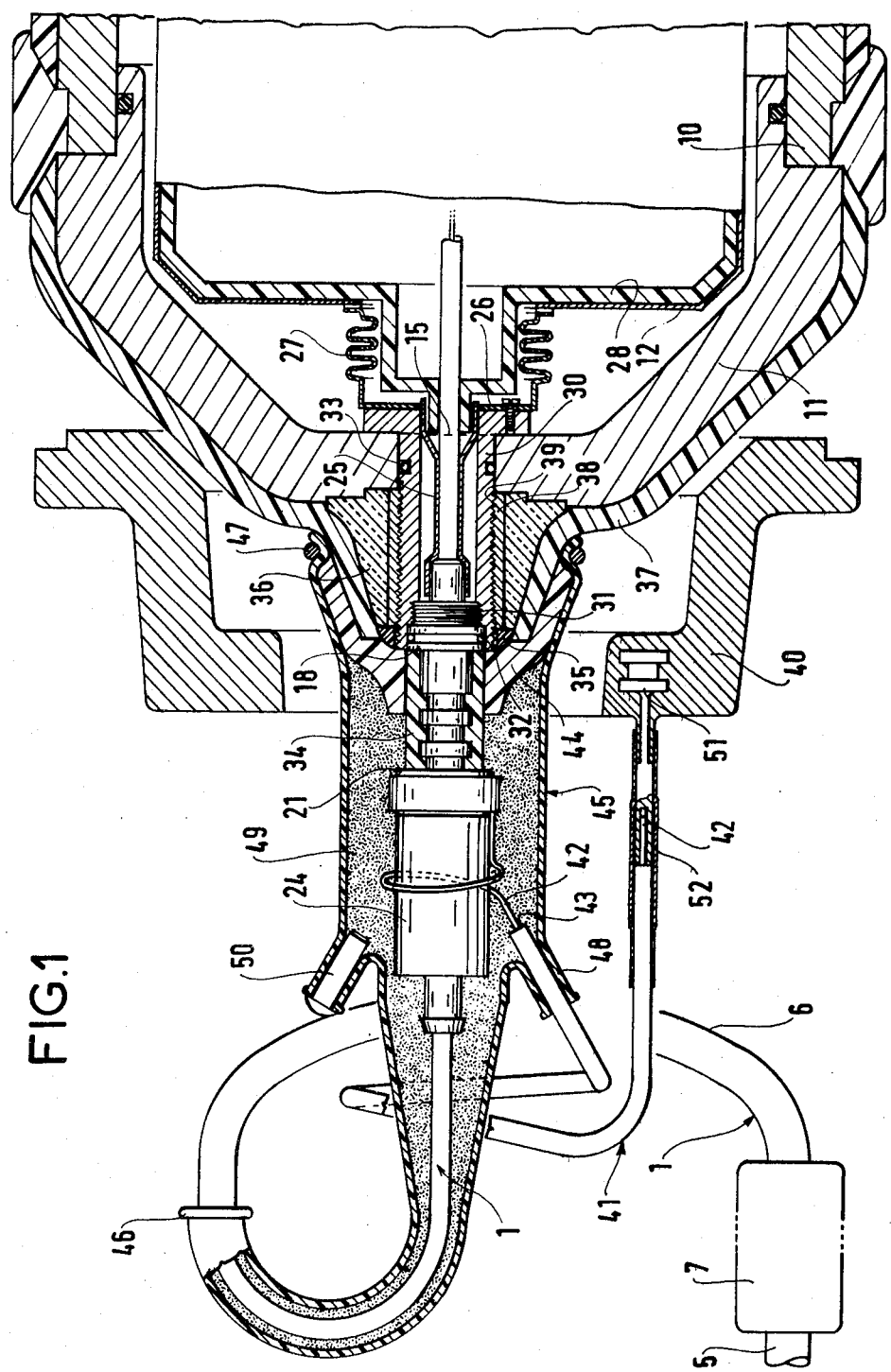
FIG. 1 illustrates an arrangement for connecting a repeater to a coaxial line cable in accordance with the invention.
Figure 2:
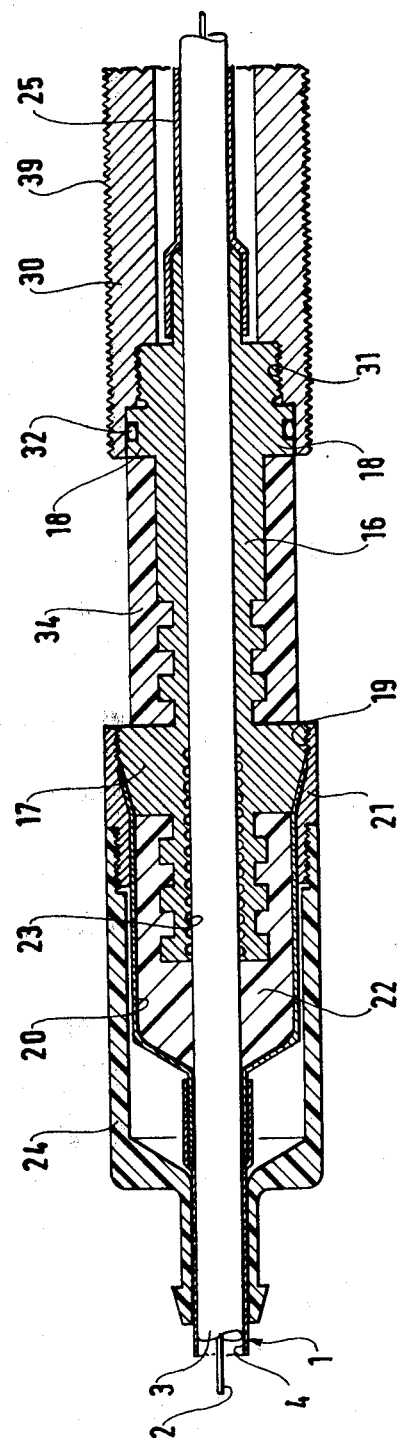
FIG. 2 illustrates a part of the connecting arrangement of FIG. 1, at the repeater end, on a larger scale than in FIG. 1.

FIGS. 1 and 2 show the connection arrangement constituted by a single length of coaxial cable 1, called a lead-in cable, whose central conductor is referenced 2; the insulating sheath which surrounds the central conductor is referenced 3 and the outer conductor is referenced 4. The portion of the lead-in cable at the line conductor cable end referenced 5 is sheathed, the outer sheath thus formed being referenced 6. The sheathed end part of the lead-in cable is preformed in a helical configuration around the connection arrangement and is connected to the line conductor cable 5 by a connection 7 made at sea.

A repeater is schematically shown to the right of FIG. 1. The repeater includes a steel housing constituted by a cylinder 10 closed at both ends by a cover such as 11, only one of which is shown, and an electronics block contained in the housing, only the lateral outer wall 12 of the block being illustrated.

An access hole 15 for the lead-in cable 1 is provided in the cover 11. The dispositions described hereinbelow with reference to the only cover shown 11 and to the connection arrangement illustrated apply also to the cover at the other end of the housing through which there passes another connection arrangement for connecting the repeater to another line cable.

On the end portion of the lead-in cable 1, the outer conductor 4 is stripped off at the repeater end, and the lead-in cable 1 is then equipped with means which allow it to be passed through the cover while maintaining the coaxial structure of the cable 1 and providing proper sealing and mechanical rigidity of the connection at the access hole 15 provided in the cover 11.

On the end portion of the lead-in cable 1, a hollow metal tube 16 at the repeater end is installed on the sheath 3 which surrounds the central conductor 1. The tube 16 is notched in its outer surface and has two collars: a collar 17 at the outer conductor 4 end and a collar 18 at the repeater end. A metal shell 20 connects the outer conductor 4 and the notched tube 16. One end of the metal shell 20 surrounds the sheath 3 and is trapped under the outer conductor 4 which is electrically connected thereto. The other end of the shell 20 partially covers the collar 17 and is connected to the collar by means of a metal connection part 21. Here, the part 21 covers the end of the shell 20; its end is tapped and screwed onto the collar 17 which has a thread at 19 for the purpose. A polyethylene plug 22 inside the shell 20 is moulded over the sheath 3 and welded thereto. It contains the end of the notched tube 16 up to the collar 17; the end of the notched tube 16 is potted in the plug 22; it has, on its inside, anti-creep ribs 23. As shown in FIG. 1, the metal shell 20 is outside the repeater. It is protected by a covering of insulating material 24 clamped or fixed at one end of the outer conductor 4 and at the other end on the connection part 21 of the shell 20 with the notched tube 16. A metal sheath 25 installed on the sheath 3 extends the notched tube 16 towards the inside of the repeater. One end of the sheath 25 is slightly flared; it covers the end of the notched tube 16 and is electrically connected to that end. The other end of the sheath 25 is also slightly flared and is electrically connected to a metal part 26 which is connected to the outer side wall 12 of the electronics block by metal bellows 27 to absorb any mis-alignment. The side wall 12, the bellows 27 and the metal part 26 have an insulating inner coating shown schematically at 28 which extends between the flared end of the sheath 25 and the sheath 3 which surrounds the central conductor.

A brass ring 30 is screwed onto a threaded portion of the notched tube 16, in the vicinity of the collar 18, the thread being referenced 31; the brass ring forms a shoulder on the inside of the housing on which the metal part 26 is fixed by screws, as illustrated. The ring surrounds the metal sheath 25 and constitutes a mechanical support for the connection device, perpendicular to the access hole 15 provided in the cover. The front part of the brass ring 30 covers the whole of the collar 18 and surrounds a seal ring 32 in a groove provided on the periphery of the collar 18. The rear part or shoulder of the ring 30 connected to the part 26 forms a stop for the cover 11; the ring has a perioheral groove perpendicular to the access hole provided in the cover 11; another seal ring 33 is held in the peripheral groove by the edges of the access hole 15.

An outer casing 34 made of polyethylene is welded to and moulded over the notched tube 16 between the two collars 17 and 18.

Thus, the electrodes block is directly equipped with its connection arrangement constituted by the lead-in cable whose central conductor enters the electronics block without any discountinuity and whose discontinuous outer conductor is electrically connected at the repeater end to the outer side wall of the electronics block by metal parts, while maintaining the generally coaxial structure, said metal parts providing rigid and leak-proof mechanical connection with the repeater housing.

Due to the fact that the connection arrangement is installed directly on the electronics block, the cover 11 is drawn onto the lead-in cable to close the housing of the repeater. The diameter of the access hole 15 in the cover 11 is very slightly greater than the diameter of the insulating plug 22 and of the connection part 21 of the shell 20 and of the notched tube 16 and than the diameter of the brass ring 30.

The access hole 15 in the cover 11 is also arranged so that it extends coaxially towards the outside of the repeater by a funnel whose diameter is greater than that of the access hole 15,, said funnel being delimited inside a socket 36 made of epoxy moulded over the cover round the access hole 15.

The cover 11 drawn onto the connection device abuts against the end of the ring 30. A nut 38 recessed in the funnel co-operates with a thread referenced 39 on the ring 38 and blcoks the cover 11 in position against the shoulder. The nut 38 is fixed in the funnel by an annular cap 35 made of insulating material which, with the ring 30, stops the end of the funnel.

The cover 11, as well as the socket 36 and at least part of the cap 35 are covered with an outer polyethylene insulating casing 37 formed by moulding. A circular outer casing 44 between the casing 34 and the casing 37 mechanically connects the connection device to the cover 11 and completes the sealing of the assembly. The circular casing 44 is also formed by moulding over.

The connection arrangement is completed, as seen with reference to FIG. 1, by a sea contact electrode 40 constituted by a metal part which surrounds the connection device perpendicularly to its passage through the cover of the housing. The electrode 40 is connected by a connection cable 41 to the metal parts connected to the outer conductor of the lead-in cable 1. The conductor of the connection cable is referenced 42 and the insulating substance which surrounds the conductor and forms a sheath referenced 43. At one end of the connection cable 41, the conductor 42 is held and electrically connected to the unprotected portion of the metal connection part 21, substantially at the collar 17. The fixture of the conductor 42 on the part 21 is protected by a hood or sleeve 45 in the shape of a teat, made of a substance such as that known by the name of neoprene. The narrow end of the hood is fixed on the outer sheath 6 of the lead-in cable; the other end is fixed on the casing 37 of the cover 11, on the socket 36; these fixtures are provided by clamping seals or rings 46 and 47. The hood allows access to the connection cable 41 and is clamped on the connection cable 41 perpendicularly to the passage 48 of the lead-in cable. The free inner portion 49 of the hood 46 is filled with a compound, e.g. polyisobutylene injected through a closable access hole referenced 50.

The other end of the connection cable 41 is connected to the electrode 40 which is toroidal and partially surrounds the cover at the access hole 15. A metal part 51 in the form of a nail connects the electrode to the conductor 42. The head of the part 51 is held in the electrode; its end has an inner duct in which the conductor is inserted and held by a crimped outer sleeve 52.

Figure 3:
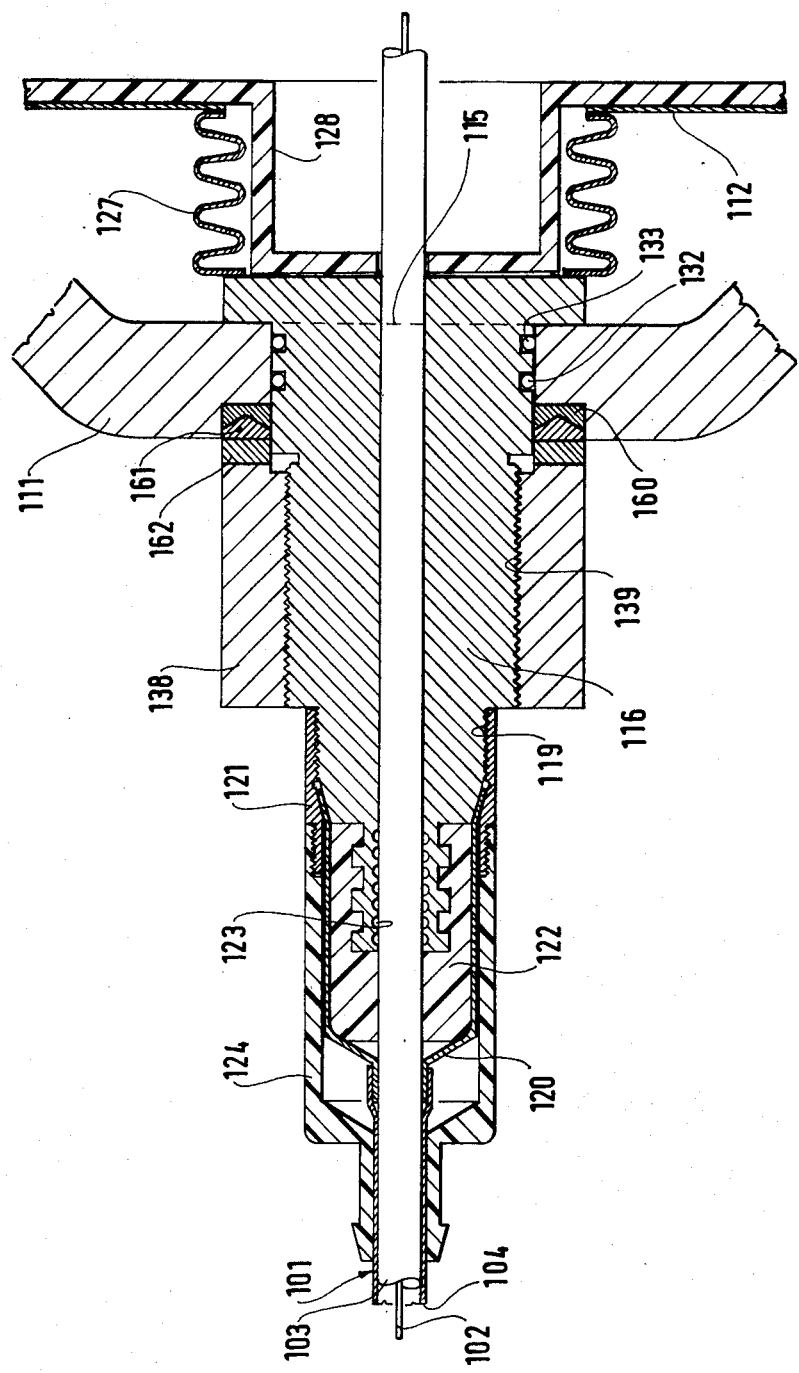
FIG. 3 illustrates a variant of the connecting arrangement in accordance with the invention, showing only the repeater end of the connecting arrangement.

FIG. 3 illustrates a variant of the connection device with which a repeater is equipped; the connection to the line conductor cable is identical to the one illustrated in FIG. 1 and is not shown. The connection device is also constituted by a lead-in cable referenced 101 which is installed directly on the electronics block whose outer side wall is referenced 112; in contrast, in FIG. 3, the cover 111 of the housing of the repeater is not insulated but is directly in contact with sea water.

The inner conductor of the lead-in cable is referenced 102; the insulating sheath which surrounds the conductor 102 is referenced 103; and the outer conductor is referenced 104. At the repeater end, the outer conductor 104 is cut and the lead-in cable is equipped with a hollow metal tube 116 which surrounds the sheath 103. The tube 116 is notched, from the outside of the repeater inwards; the figure shows an end portion with a small diameter and regular notches and four successive stages which increase in size towards the inside of the repeater, the last stage forming a shoulder which acts as a stop for the cover 111 of the repeater. A metal shell 120 which surrounds the sheath 103 connects the outer conductor 104 to the notched tube 116. One end of the shell 120 is inserted under the outer conductor 104 which welded thereto; the other end of the shell 120 covers one face of the first stage of the surface of the notched tube 116 and is held in close connection by a metal connecting part 121, part of which covers the end of the shell and another tapped part of which is screwed on the first threaded stage on the surface of the tube 116, the tapping and the thread are referenced 119. The shell 120 contains a polyethylene plug 122 welded on the sheath 103 and in which the end portion of the tube 116 is potted, said end portion having anti-creep ribs 123. A covering 124 fixed on the outer conductor and the connecting part 121 protect the shell 120.

Metal belows 127 welded on the other end of the notched part 116 connect the part 121 with the outer lateral wall 112 of the electronics block. The metal bellows 127 are also welded to the wall 112. The end surface of the tube 116, the bellows 127 and the wall 112 are coated on the inside with an insulating material schematically shown at 128.

The electronics block is thus equipped as before with its arrangement for connecting it to the line conductor cable constituted by a length of coaxial cable whose sheathed inner conductor enters the electronics block directly and whose outer conductor, which is cut near the repeater, is substituted by metal parts which maintain the coaxial structure and allow a rigid sealed mechanical connection to be provided between the lead-in cable and the repeater housing.

Due to the fact that the connection arrangement is installed directly on the electronics block, the repeater housing is closed by putting the cover 111 provided with an opening or access hole 115 on the lead-in cable. The diameter of the access hole 115 is just sufficient for this installation. The cover installed on the lead-in cable abuts against the shoulder formed by the last stage at the periphery of the part 116 which, in order to provide proper sealing at the access hole 115, carries two seal rings 132 and 133 perpendicularly to the access hole of the cover in the housing closed position. These seals 132 and 133 are recessed in two circular grooves, not referenced, formed on the stage which precedes the shoulder; they are held in these grooves by the wall which delimits the access hole 115.

A nut 138 inserted on the lead-in cable 101 is screwed on the second stage of the periphery of the part 116. For that purpose, the stage has a thread referenced 139. The nut 138 blocks the cover in position against the shoulder of the part 116. To provide proper tightening of the mechanical connection between the lead-in cable and the cover in the housing closed position of the repeater, the outer edge of the access hole 115 is appropriately equipped. The outside edge of the access hole 115 has a circular clearance which contains:

a toroidal part 160 made of soft metal, e.g. lead, said part pressing against the bottom of the clearance and has a V-shaped axial cross-section open towards the outside of the housing; a middle annular part 161 made of hard metal—steel, like the cover—with a V-shaped axial cross-section, which fits into the part 160; and, lastly, a washer 162 which presses against the middle part 161. The washer 162 extends beyond the periphery of the cover. Therefore, the nut 138 abuts on it and it transmits the clamping force to the annular part 161. This causes the soft metal part 160 to be crushed. Therefore, self-tightening is obtained as a function of the pressure exerted by the nut.

In the two embodiments described with reference to FIGS. 1 and 2 and to FIG. 3, the electronics block is directly equipped with its connection arrangement formed by a length of cable which is itself equipped with the means for sealing at the passage in the housing and which is ready to be connected to the line cable. Hence, all connections inside the housing are dispensed with and by this very fact, an excessive length of cable between the electronics block and the outlet of the repeater housing is avoided. In these conditions, the final measurements and adjustments on the repeater can be made at sea directly from the end of the lead-in cable from the connector 7.

I claim:

1. A sealed connection between a coaxial underwater cable and an underwater device comprising an electronics block housed in a sealed housing; said housing having at least one cover including an access and a length of lead-in coaxial cable which passes through the access in a sealed manner, the lead-in cable being connected to the electronics block at one end and having means at its other end external to the housing for connection to a coaxial cable, wherein a length of the lead-in coaxial cable in the vicinity of where it passes through the access is stripped of its outer conductor and the insulation surrounding the inner conductor is fitted in the bore of a metal tube having a notched outer surface, i.e. a surface which is crenellated in axial section, the outside end of the notched metal tube being electrically connected to the outer conductor of the lead-in coaxial cable by means of a metal shell which covers a plug of insulating material itself welded to a stripped length of the insulation covering the inner conductor and also embracing a notched length of the notched metal tube to provide a grip thereon, the inside end of the notched metal tube being electrically connected to the electronics block via annular metal bellows, and the lead-in cable being provided where it passes through the access with sealing means and means for locking it therein.

2. A sealed connection according to claim 1, wherein the notched metal tube is connected to the bellows both by a conductor covering insulation surrounding the inner conductor and by a threaded ring made of strong and electrically conductive alloy, one of the ends of the threaded ring being mechanically connected to said notched metal tube and its other end forming a stop for the cover, said threaded ring serving to lock the lead-in cable in the access hole by means of a nut which holds seal rings to seal the cover to the threaded ring and the notched tube.

3. A sealed connection according to claim 2, wherein the notched tube has two collars on whose peripheries said metal shell and said threaded ring are respectively fixed.

4. A sealed connection according to claim 3, wherein the notched tube is covered between the said collars with a sealed outer casing made of polyethylene.

5. A sealed connection according to claim 2, 3 or 4, wherein outside the housing the access in the cover is provided with a funnel which receives said nut, said funnel including a socket made of thermosetting resin formed on said cover and covered, together with the cover, with a sealed casing made of polyethylene, said nut being enclosed in the funnel on the threaded ring by an annular cap, and frusto-conical outer casing which mechanically connects the cover of the housing to said lead-in cable by passing over the said cap.

6. A sealed connection according to claim 1, wherein the notched tube has a plurality of stages of successively greater diameter from the outside towards the inside of the housing, the end stage inside the housing forming a stop for said cover, the last stage but one holding, between itself and the cover, the said sealing means, the last stage but two having a screw thread and constituting, together with a nut installed on said thread, said means for locking the lead-in cable in said access of the cover.

7. A sealed connection according to claim 6, further including a first toroidal part made of soft metal, a second toroidal part made of hard metal which fits partially into said first part and a thrust washer between said nut and said second part, thus providing self-tightening of the locking means, said parts being recessed in a peripheral clearance in the cover, open in the access and towards the inside of the housing, and being held under said last but one stage of the notched part.

* * * * *